July 5, 1938.  L. E. PADELFORD ET AL  2,122,948
DUSTPAN
Original Filed April 24, 1933
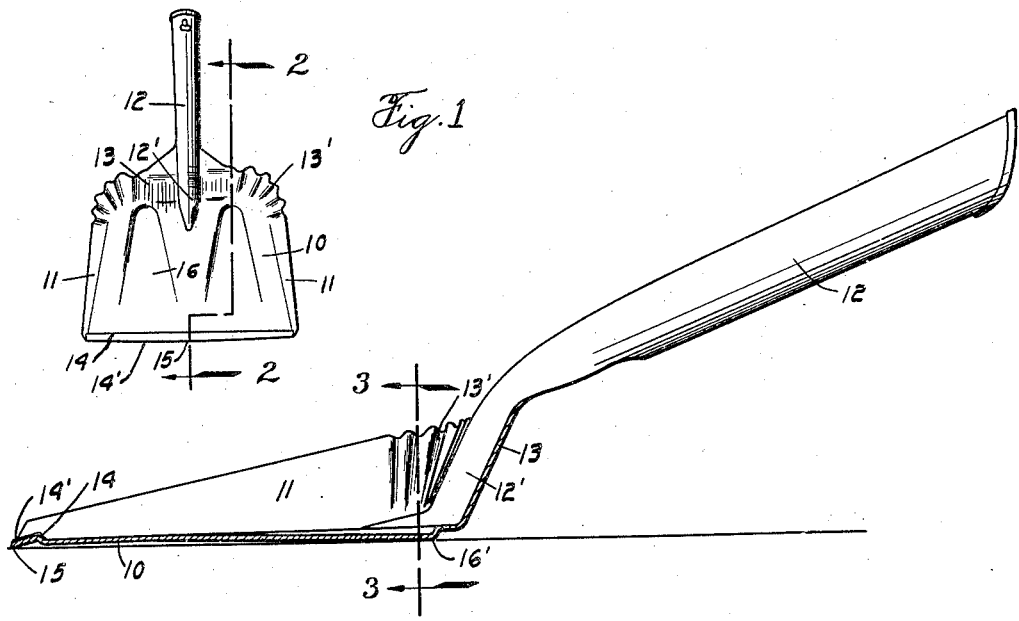
Fig. 1
Fig. 2
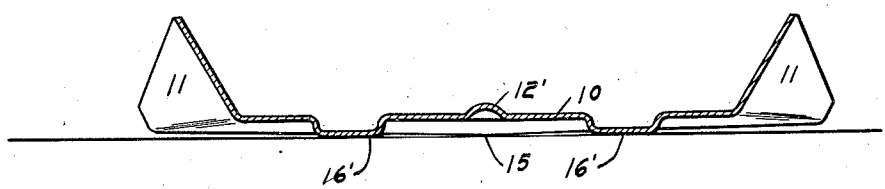
Fig. 3
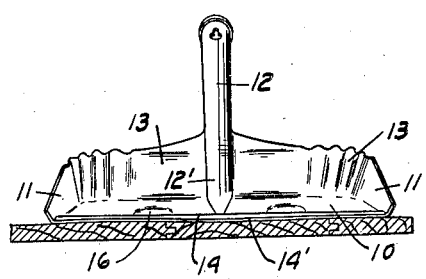
Fig. 4
INVENTOR
LESTER E. PADELFORD
ASHLEY F. WILSON,
BY
ATTORNEY Patented July 5, 1938

2,122,948

UNITED STATES PATENT OFFICE 2,122,948

DUSTPAN

Lester E. Padelford, North Arlington, and Ashley F. Wilson, Montclair, N. J., assignors to Central Stamping Company, Newark, N. J., a corporation of New York Refiled for abandoned application Serial No. 667,620, April 24, 1933. This application February 8, 1935, Serial No. 5,636

5 Claims. (Cl. 65—20)

This invention relates to dust pans and has for its principal object to provide a new and improved construction of neat and attractive appearance and in which a number of novel features of construction have been combined to provide marked advantages of utility and durability.

Considered more specifically, one of the principal objects of the invention is to provide a new construction for a dust pan such as used for domestic purposes capable of being stamped and blanked out of a single sheet of metal by a blanking and forming operation, thereby enabling a dust pan of extremely attractive appearance and having marked functional advantages over prior constructions, to be manufactured at a very low cost of production.

Another object is to provide a dust pan so constructed as to have spaced three point supporting surfaces arranged in, what may be termed, a tripod relationship, and so that the center of gravity of the pan falls within the tripod and as a result the pan will rest on a horizontal surface in a position of stable equilibrium with its front or dust gathering edge in contact with such surface.

A further object is to provide a dust pan with a downwardly inclined flexible forward edge so constructed and arranged that the center of such forward edge will contact with a floor or other surface and which also forms one of the spaced three point supports above referred to.

Another object is to provide a dust pan in which the pan portion has formed therein trough like depressions, the depth of which gradually increases towards the rear end of the pan whereby the under surfaces of the depressions cooperate with the front inclined edge of the dust pan to form the three point spaced supporting surfaces, and the depressions are so constructed and arranged as to reinforce or strengthen the pan portion to give it desired stiffness towards the handle while insuring that the front edge of the pan will have a certain amount of flexibility.

A further object is to construct a dust pan with a downwardly inclined outwardly bowed or curved front edge having an inherent flexibility so as to insure contact of the entire front edge of the pan with the surface upon which the pan is being used, by merely raising the handle portion of the pan, the downwardly inclined front edge terminating in a slightly raised ledge which tends to prevent crumbs or dust from too readily falling out of the pan.

Another object is to construct a dust pan with a flexible outwardly curved leading edge so that such leading edge may, by exerting downward pressure upon the handle, be caused to conform to slight irregularities in the surface upon which the pan is being used.

A further object is to provide a dust pan with a relatively long handle thereby obviating the necessity of the user's stooping or bending unduly while using the pan, thus eliminating some of the fatigue necessarily attendant upon the use of dust pans as heretofore constructed, and to so proportion the handle with respect to the pan portion as to insure an excellent balance of the weight of the entire structure with respect to the handle that renders its use less fatiguing.

Another object is to provide the pan with relatively high side and rear wall portions which serve not only for securing an exceptionally strong and sturdy construction because of the strengthening effects of said side and end wall portions, but also serve to prevent dirt from being swept over the pan, and a further object is to so proportion and arrange the parts of the entire structure as to secure a dust pan of remarkably neat and attractive appearance.

The above and other objects will appear more fully from the following more detailed description and by reference to the accompanying drawing forming a part hereof and wherein Fig. 1 is a top or plan view of a dust pan constructed in accordance with the principles of the present invention.

Fig. 2 is a section taken substantially on the line 2—2 of Fig. 1.

Fig. 3 is a horizontal section through the rear end of the pan portion proper and taken substantially on the line 3—3 of Fig. 2.

Fig. 4 is a front elevation of the pan showing the manner in which the flexible forward edge of the dust pan may be caused to conform to an uneven surface.

As shown in the drawing, the pan is preferably constructed from a single sheet of metal and comprises the bottom 10 of the pan portion per se which merges into the upwardly extending side wall portions 11 and the rear wall portion 13. The side wall portion, as clearly shown in Fig. 2, preferably increases in height rearwardly and the rear side corners of the pan where the side walls join with the rear wall 13 are preferably crimped as at 13' to take care of the excess material in the forming operation and also to serve to strengthen the entire structure.

Additional strengthening of the structure is provided by the rib 12' formed in the rear wall 13 and located at and in continuation of the handle 12; the latter being formed integrally with the pan portion and being of a tapered, tubular form in accordance with the usual construction of devices of this character.

At its forward edge the pan portion per se is formed with an upwardly extending transverse rib 14 which extends entirely across from one side wall to the other, and the portion of the pan extending forwardly of the rib 14 is inclined downwardly to terminate in a flexible dust gathering edge 14', the forward extremity of which is curved and bowed outwardly. As indicated by the reference character 15 on Figs. 1 and 2 of the drawing, the central portion of the forward edge contacts with the surface upon which the dust pan rests. The pan portion per se has formed therein a pair of troughs 16, which, as shown in Fig. 1, decrease gradually in width from the front to the rear and as shown in Fig. 2 increase gradually in depth from front to rear. The lower surfaces 16' of the rearward ends of the trough sections 16, form a pair of supporting surfaces spaced equally on each side of the longitudinal center line of the entire structure and the center forward edge 15 of the pan forms with the two supporting surfaces 16' a three point spaced support upon which the dust pan is adapted to rest. It will be noted from Fig. 2 that the supporting surfaces 16' are located relatively close to the rear wall 13 of the pan and as the major portion of the weight of the pan resides in the side walls of the weight of the pan portion per se located forwardly of the supporting surfaces 16', the center of gravity of the entire structure lies forwardly of said supporting surfaces 16' and between the triangularly spaced three point support formed by the surface 16' and the center 15 of the downwardly curved forward edge of the pan. The center of gravity, however, lies relatively close to the forward end of the handle 12 so that a balance of the entire structure is nicely obtained.

The formation of the rib 14 at the forward end of the pan enables the front dust gathering edge of the pan to be inclined downwardly to secure the desired flexibility of said edge, and also serves to strengthen the front edge of the pan in a transverse direction and to obviate, to a considerable extent, the transverse distortion or curving of the pan, such as occurs after a relatively short period of use with the ordinary constructions. The rib 14 also serves to prevent particles swept into the pan from accidentally sliding out of the pan when the latter is lifted from the floor after a dust collecting operation.

As the troughs 16 decrease gradually in depth towards their forward ends so as to merge with the flat forward portion of the dust pan proper, the troughs are self clearing in their action and permit any particles collected in the pan to pass readily outwardly of the troughs when the pan is emptied. In addition the spaced location of the troughs 16, one on each side of the longitudinal center of the structure also cooperate with the rib 14 to prevent objectionable warping curvature of the pan portion.

As a result of the curving of the forward edge of the pan and its downward inclination, together with the strengthening effect of the troughs 16 and the rib 14, contact of the central portion of the dust collecting edge will be maintained after a long period of ordinary usage and the objectionable upward curving of the central portion such as occurs in dust pans as commonly constructed is obviated with a pan constructed in accordance with the principles of the present invention.

In the ordinary dust pan the ends of the forward edge are reinforced by reason of the fact that the sides are vertical. Hence, on an uneven surface, or sometimes on a smooth surface, when pressure is exerted downwardly on the handle, there is a tendency for the center of the leading edge to bow upwardly. By curving this leading edge outwardly and lifting the handle slightly while exerting a pressure downwardly, contact of the leading edge with the surface, from which dust is collected, is more easily obtained in that contact of the leading edge with the floor is first obtained in the center. As more pressure is used, the leading edge is flexed extending the line of contact in both directions from the center until finally with more pressure the entire edge is brought into contact, those portions of the edge reinforced by the rigid sides being the last to be brought in contact with the surface.

The handle 12 is somewhat longer than in the ordinary construction and as shown, its length is preferably not less than the length of the bottom of the pan, but still the weight of the handle does not overbalance the weight of the pan portion per se because of the fact that the side walls 11 are made considerably higher than in the usual constructions, the weight of the material used in the higher side wall portion serves to bring the center of gravity of the pan in advance of the supporting surfaces 16' and between such surface and the center 15 of the front edge. The pan is constructed of a single sheet of metal, which not only tends to increase the strength of the structure but also enables it to be manufactured by a simple blanking and forming operation, thereby enabling the device to be manufactured and sold at a relatively low cost.

While we have described a satisfactory constructional example, it will be understood that many changes, variations and modifications may be resorted to without departing from the principles of the invention.

I claim:

1. In a dust pan, a main pan portion having formed therein a pair of longitudinally extending depressed troughs increasing gradually in depth from adjacent the forward edge of the pan towards the rear thereof, said troughs merging at their forward ends into the plane of said bottom, the under surface of said troughs at their rear edge forming a pair of spaced supports which cooperate with the forward edge of the pan to hold it in a position of stable equilibrium.

2. In a dust pan, a main pan portion comprising a bottom, a side and rear wall, said bottom being formed with a transverse rib adjacent to its forward edge and a downwardly inclined, flexible dust collecting edge extending forwardly from said rib, said dust collecting edge curving upwardly and rearwardly from its center and said bottom portion being provided with a pair of troughs of gradually increasing depth from front to rear of said pan, said troughs merging at their forward ends into the plane of the bottom portion, the rear under surfaces of said troughs forming with the said flexible forward edge a three point supporting surface, and the center of gravity of the entire pan being located between said three point supporting surfaces.

3. A one piece sheet metal dust pan having a handle and a pan portion comprising a bottom, a back wall and a pair of side walls, said pan portion having a raised central reinforcing rib extending across said back wall in prolongation of said handle and merging at its front end into the plane of said bottom and a pair of depressed reinforcing ribs of gradually decreasing depth and increasing width from rear to front of said bottom, said pair of ribs extending rearwardly beyond the front end of said central rib and merging at their front end into the plane of said bottom.

4. A one piece sheet metal dust pan having a handle, and a pan portion comprising a bottom, a back wall and a pair of side walls, said bottom having a downwardly inclined dust collecting front portion terminating in a dust collecting edge the central part of which extends below the sides thereof whereby said central part only of said edge will contact normally with a surface from which dust is to be collected, and said pan portion having a raised central reinforcing rib extending across said back wall in prolongation of said handle and a pair of depressed reinforcing ribs one on each side of said central rib, and of gradually decreasing depth and increasing width from rear to front of said bottom, extending forwardly from a point rearwardly of the front edge of said central rib and merging into the plane of said bottom rearwardly of said front portion thereof and said front portion being flexible whereby when pressure exerted is downwardly on said handle said dust collecting edge will be forced into close contacting engagement with said surface across the entire width of said pan and said reinforcing ribs will prevent flexure or buckling of the rearward parts of said pan portion.

5. A dust pan as set forth in claim 4 in which the rear lower surfaces of the pair of reinforcing ribs and the central part of said dust collecting edge form three triangularly arranged supports symmetrically disposed with respect to the longitudinal center line of the pan and the center of gravity of the pan lying within a triangle connecting said supports so that said pan will rest on said supports in a position of stable equilibrium.

LESTER E. PADELFORD.
ASHLEY F. WILSON.